United States Patent
Chiavarotti et al.

(10) Patent No.: US 6,452,783 B1
(45) Date of Patent: Sep. 17, 2002

(54) PROCESS FOR THE PRODUCTION OF AN ANODE FOR AN ELECTROLYTIC CAPACITOR, ANODE PRODUCED BY SUCH PROCESS, AND CAPACITOR HAVING SUCH ANODE

(75) Inventors: Giovanni Pietro Chiavarotti, Milan (IT); Francesco Di Quarto, Bagheria (IT); Monica Santamaria, Licata (IT); Carmelo Sunseri, Palermo (IT)

(73) Assignee: Becromal S.p.A., Quinto de' Stampi Rozzano MI (IT)

( * ) Notice: Subject to any disclaimer, the term of this patent is extended or adjusted under 35 U.S.C. 154(b) by 0 days.

(21) Appl. No.: 09/695,229

(22) Filed: Oct. 25, 2000

Related U.S. Application Data

(62) Division of application No. 09/295,257, filed on Apr. 20, 1999, now Pat. No. 6,325,831.

(30) Foreign Application Priority Data

Apr. 20, 1999 (DE) .......................... 198 17 405

(51) Int. Cl.[7] .................................................. H01G 9/04
(52) U.S. Cl. ...................... 361/508; 361/516; 361/433; 361/525; 361/529; 29/25.03
(58) Field of Search .............................. 361/508, 512, 361/509, 511, 523, 525, 529, 516, 433, 503, 504; 29/25.03

(56) References Cited

U.S. PATENT DOCUMENTS

| | | | | |
|---|---|---|---|---|
| 3,612,956 A | * | 10/1971 | Sterling | 317/230 |
| 4,091,138 A | | 5/1978 | Takagi et al. | 428/209 |
| 4,426,260 A | * | 1/1984 | Stevens | 204/33 |
| 4,763,229 A | | 8/1988 | Ohtuka et al. | 361/433 |
| 4,970,626 A | * | 11/1990 | Kakinoki et al. | 361/512 |
| 5,124,022 A | * | 6/1992 | Evans, II et al. | 205/175 |
| 5,733,661 A | | 3/1998 | Ue et al. | 428/426 |
| 5,754,394 A | | 5/1998 | Evans et al. | 361/516 |
| 5,837,121 A | | 11/1998 | Kinard et al. | 205/322 |
| 5,914,852 A | * | 6/1999 | Hatanaka et al. | 361/523 |

FOREIGN PATENT DOCUMENTS

GB    2 056 503    3/1984

* cited by examiner

*Primary Examiner*—Dean A. Reichard
*Assistant Examiner*—Nguyen T Ha
(74) *Attorney, Agent, or Firm*—Wenderoth, Lind & Ponack, L.L.P.

(57) ABSTRACT

An anode for an electrolytic capacitor includes aluminum foil as a substrate. On the aluminum foil is an alloy including aluminum and a further metal whose oxide has a higher dielectric constant than aluminum oxide. This alloy increases the surface roughness and is in vapor deposited in vacuum in several process steps at different angles of incident. A porous layer thereby is formed and a subsequent anodic oxidation is carried out.

17 Claims, 1 Drawing Sheet

PROCESS FOR THE PRODUCTION OF AN ANODE FOR AN ELECTROLYTIC CAPACITOR, ANODE PRODUCED BY SUCH PROCESS, AND CAPACITOR HAVING SUCH ANODE

This is a divisional of Ser. No. 09/295,257, filed Apr. 20, 1999 now U.S. Pat. No. 6,325,831.

BACKGROUND OF THE INVENTION

1. Field of the Invention

The invention relates to a process for the production of an anode for electrolytic capacitors as well as to anodes produced thus.

2. Description of the Related Art

For a capacitor comprising two metal plates separated by means of a dielectric of a given strength, the capacitance is a function of the dielectric constant of the dielectric, the vacuum dielectricity, the geometric area a well as the distance between the metal plates. In order to arrive at higher capacitance values at a given area, the thickness of the dielectric can be decreased, the effective surface of the metal plates can be increased by roughing and a dielectric with a higher dielectric constant can be used.

It is known that, compared with other metal oxides, aluminum oxide has considerable advantages due to the fact that from an aluminum foil can be generated anodically with electrochemical etching, films with the formation of aluminum oxide with good insulating properties and with high roughness such that very high capacitance values can be attained in spite of the relatively low dielectric constant of aluminum oxide in comparison with other metal oxides, such as those of titanium or tantalum.

GB-B 2 056 503 discloses a process for the production of an electrolytic capacitor in which a flexible substrate is used with a surface onto which an anodizable metal is vapor-deposited. The vapor deposition take place at an angle of incidence of less than 60° in the presence of oxygen and at a partial pressure not greater than $10^{-1}$ Torr to form a porous metal layer. The porous metal layer is subsequently anodized and a capacitor is wound from such foils. The substrate can be aluminum and the anodizable metal can be tantalum or an alloy of two or several metals.

SUMMARY OF THE INVENTION

It is the task of the present invention to propose a process for the production of anodes, as well as the anodes themselves with the aid of which, in simple manner, capacitors of higher capacitance can be fabricated.

This task is solved through a process for the production of an anode for electrolytic capacitors from an aluminum foil as the substrate onto which an alloy of aluminum and a further metal whose oxide has a higher dielectric constant than aluminum oxide, is vapor-deposited to increase the surface roughness in several process steps at different angles of incidence in a vacuum with the formation of a porous layer and which is subjected to a subsequent anodic oxidation.

With anodes produced in this way, substantially higher capacitance values at an identical anodization voltage can be obtained than is the case when using conventional aluminum foils.

As an aluminum alloy, one which comprises a valve metal such as titanium, tantalum, niobium, zirconium or the like is preferably used.

In order to attain a surface of the porous layer of maximum size, the aluminum alloy is preferably vapor-deposited with a metal vapor beam in three successive process segments. For structuring a first thin adhering layer with first crystallization nuclei, in a first process segment the angle of incidence between the metal vapor beam and a surface normal should be large, for example at least 75°. In order to make optimum growth of crystals with dendritic structure possible, in a second process segment, medium angles of incidence, for example between 40° and 60°, are provided. At the conclusion of the crystal growth, in a third process segment, the aluminum alloy is vapor-deposited at any desired angle, preferably however at a small angle of incidence, for example maximally 40°.

In one process segment, the vapor deposition advantageously takes place in several process steps at differing angles of incidence. It is, in particular, meaningful to provide in the plane of incidence angles on both sides of the surface normal in order to attain growing-on of the crystals symmetrical with respect to vertical.

To improve the stability of the porous layer, the aluminum alloy can be vapor-deposited in one or several process steps while a protective gas such as, for example nitrogen, is introduced. This is, in particular, advantageous during the last process segment for the stabilization of the crystalline structure.

Depending on the desired results, the aluminum alloy is advantageously vapor-deposited at a foil temperature between 50° C. and 300° C.

A further increase of the capacitance can he attained if, after the vapor deposition and oxidation, the aluminum foil is subjected to a heat treatment for a given length of time of, for example, approximately 1 to 3 hours, for example in air or an inert gas atmosphere at a given elevated temperature of, for example 350 to 500° C. For example, argon can serve as the inert gas.

It is further proposed with the invention to subject the aluminum foil after the temperature treatment to a repeated oxidation.

As the substrate, for example, an aluminum foil with a percentage purity of approximately 99.5 is suitable.

Good values for the capacitances were attained in particular if the aluminum alloy comprises a fraction of valve metal between approximately 20 and 40%.

To heat and vaporize alloy metals disposed in one or several melting crucibles, for example, an electron beam is used with an energy adaptable appropriately to the particular metals. In this way, a uniform deposition of the alloy on the aluminum foil is obtained.

The invention relates also to anodes which have been produced according to the previously discussed process, as well as to electrolytic capacitors with such anodes.

The following Table shows the results of comparison experiments for aluminum foils of conventional type and aluminum foils according to the invention with Al—Ti or Al—Ta alloy coating with the alloys being anodized at constant growth rate under identical experimental conditions and at the identical final voltage Vf=22 V. It can be seen that higher capacitance values for aluminum foils with Al—Ta alloy coating or Al—Ti alloy coatings were attained, wherein the tantalum content was approximately 35%, and the titanium content was approximately 20 to 40%. Evident are also the still higher capacitance valves measured on samples after the heat treatment. To some extent, a doubling of the capacitance values resulted.

Physicochemical examination of the dielectricity films by means of photocurrent and electrochemical impedance spectrometry showed that the mixed oxide films behave like insulators with relatively large band intervals and very low dielectricity losses. The large band interval values, low dielectric losses in a wide frequency range (1 to 1.5 kHz) and better chemical stability of the mixed oxides in aqueous solutions, in comparison to an aluminum oxide, make the use of the films as dielectrica for electrolytic capacitors especially suitable.

BRIEF DESCRIPTION OF THE DRAWING

The sole FIGURE shows schematically a vapor deposition of the aluminum alloy on an aluminum foil with reference to an embodiment.

DETAILED DESCRIPTION OF THE INVENTION

Figure 1:
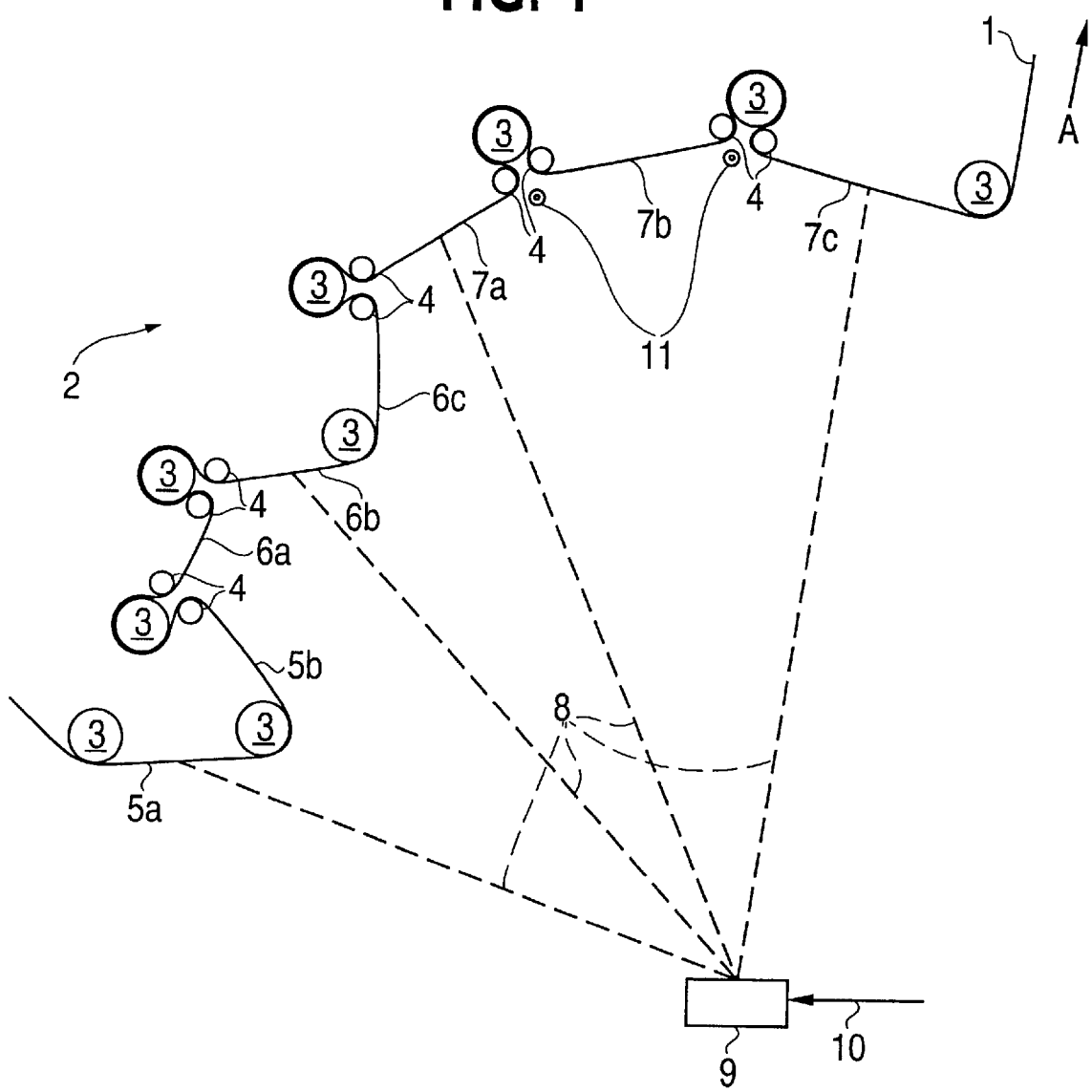

An aluminum foil 1 is clamped into a guidance device 2 with a multiplicity of large deflection rollers 3 and small deflection rollers 4. Between the particular deflection rollers 3, 4 are disposed flat foil sections 5a, 5b, 6a, 6b, 6c, and 7a, 7b, 7c, which are each exposed to a metal vapor beam 8. The metal vapor beam is generated by vaporizing alloy metals in one or several melting crucibles 9. For this purpose, an electron beam 10 is guided such that it heats the alloy metals in all melting crucibles 9 simultaneously, and the electron beam can impinge on the different alloy metals at different energies. Through suitable arrangement of the melting crucibles 9, a uniform distribution of the alloy on the aluminum foil 1 can be attained with tolerances in the range of ±5%.

During the vapor deposition of the alloy, the aluminum foil 1 is moved in a direction indicated by arrow A such that the aluminum foil 1 passes through all of the foil sections 5a to 7c. In the first process segment comprising the foil sections 5a and 5b, in two successive process steps, a first thin adhering layer with first crystallization nuclei is vapor-deposited with an angle of incidence between the metal vapor beam 8 and the surface normal (a direction normal to the surface) of the aluminum foil 1 in each instance being greater than 75°. By deflecting the aluminum foil 1 with a large deflection roller 3 about approximately 330° between the foil sections 5a and 5b, it is attained that the angles of incidence in the plane of incidence identical with the cutting plane are distributed on both sides of the surface normal in order to obtain a symmetrical structure of the crystallization nuclei. With a further large deflection roller 3, the foil is carried to the foil section 6a. In order for the large deflection roller 3 not to be exposed directly to the metal vapor beam 8, the aluminum foil 1 is guided with two small deflection rollers 4 about the deflection roller 3 such that it is nearly completely encompassed by the aluminum foil 1 and is not exposed to the metal vapor beam 8.

In the second process segment with the foil sections 6a to 6c (three process steps) dendritic crystals forming a porous portion of the layer are intended to grow. For this purpose, the metal vapor beam 8 impinges at medium angles of incidence between 40° and 60° on the aluminum foil 1 so that the crystals do not become too small since they otherwise oxidize completely during the structuring and do not participate in the capacitive structure. In the second process segment, the angles of incidence are also in the plane of incidence on both sides of the surface normal since crystals formed in this way are largest.

The third process segment comprises the foil sections 7a to 7c which are disposed in the form of a cupola. Between the foil sections 7a and 7b, and 7b and 7c, respectively, directly beneath the aluminum foil 1 are disposed gas immission openings 11 from which in suitable doses flows a protective gas, which in the present embodiment example is nitrogen. The nitrogen is captured by the metal vapor beam 8 just before application onto the aluminum foil 1 and covers the dendritic crystals with a protective nitrite layer which increases the mechanical stability of the porous layer.

On the back side of the aluminum foil 1, not exposed to the metal vapor beam 8, heating elements (not shown) are disposed in order to heat the aluminum foil 1 to a temperature between 50° and 300° at which temperature, the formation of the dendritic crystals preferably occurs. Via the deflection rollers 3, 4 the aluminum foil 1, if appropriate, can be cooled should this be necessary for a process segment.

The rate of transport of the aluminum foil 1 which affects also the temperature of the aluminum foil, is adjusted such that the thickness of the porous layer is between 0.5 $\mu$m and 5 $\mu$m.

With the method of vapor deposition according to the invention, surface increase factors between 20 and 40 have been achieved compared to a smooth aluminum foil.

The process according to the invention for generating anode foils for the production of electrolytic capacitors is to be preferred, not only from the industrial aspect but also from the standpoint of environmental protection, compared to those produced from known foils since they make superfluous the initial electrochemical etching which entails handling dangerous chemicals, large quantities of waste water and aluminum oxide powder.

Through the greater roughness attained due to the vapor deposition technique, the use of alloys with valve metals as well as that of thermal treatment succeeding the anodic oxidation and repeated anodic oxidation, aluminum foils for capacitors are proposed which represent a considerable improvement relative to the techniques used until now.

| Sample (a) | Fraction M % in Aluminum | i[mA/cm$^2$] | $C_{22v}$ [$\mu$F/Cm$^2$] | $C_{22v}$ after 2 h at 500° in air [$\mu$F/cm$^2$] | $C_{22v}$ after 2 at 500° in air and repeated anodic oxidation [$\mu$F/cm$^2$] | Estimated oxide band interval [eV] |
|---|---|---|---|---|---|---|
| Al | 0 | 0.21 | 0.26 | / | / | 6.3 |
| Al-Ta | 33.64 | 0.30 | 0.50 | 0.53 | 0.53 | 4.25 |
| Al-Ti | 39.70 | 0.40 | 0.48 | 0.75 | 0.67 | 3.87 |
| Al-Ti | 23.16 | 0.30 | 0.36 | 0.47 | 0.42 | 3.74 |

(a) Roughness factor

What is claimed is:

1. An anode for an electrolytic capacitor, said anode comprising:
   a substrate comprising an aluminum foil; and
   an alloy comprising aluminum and a metal whose oxide has a higher dielectric constant than aluminum oxide, wherein said alloy is vapor-deposited on said substrate in a vacuum in several process steps at different angles of incidence to increase surface roughness, thereby forming a porous layer, and subsequently subjecting said alloy to an anodic oxidation.

2. An anode as claimed in claim 1, wherein said metal is a valve metal.

3. An anode as claimed in claim 1, wherein said metal is one of titanium, tantalum, niobium, and zirconium.

4. An anode as claimed in claim 1, wherein said porous layer is formed by vapor-depositing said alloy in a first process segment with a metal vapor beam at large angles of incidence between the metal vapor beam and a direction normal to a surface of said substrate, in a second process segment at medium angles of incidence between the metal vapor beam and a direction normal to said surface of said substrate, and in a third process segment at any angle of incidence between the metal vapor beam and a direction normal to said surface of said substrate.

5. An anode as claimed in claim 4, wherein said porous layer is formed by vapor-depositing said alloy in the first process segment with the metal vapor beam at angles of incidence of at least 75° between the metal vapor beam and a direction normal to said surface of said substrate, in the second process segment at angles of incidence of between 40° and 60° between the metal vapor beam and a direction normal to said surface of said substrate, and in the third process segment at angles of incidence of not greater than 40° between the metal vapor beam and a direction normal to said surface of said substrate.

6. An anode as claimed in claim 4, wherein during at least one of the first process segment, the second process segment, and the third process segment, said alloy is vapor-deposited in several process steps at different angles of incidence between the metal vapor and a direction normal to said surface of said substrate.

7. An anode as claimed in claim 4, wherein said alloy is vapor-deposited in one or several subsequent process steps while a protective gas is introduced.

8. An anode as claimed in claim 7, wherein the protective gas is nitrogen.

9. An anode as claimed in claim 1, wherein said alloy is vapor-deposited at a foil temperature between 50° C. and 300° C.

10. An anode as claimed in claim 1, wherein after the vapor deposition and anodic oxidation, said substrate is subjected to a heat treatment for a given length of time in air or an inert gas atmosphere at a given elevated temperature.

11. An anode as claimed in claim 10, wherein the given length of time is approximately 1 to 3 hours.

12. An anode as claimed in claim 10, wherein the given elevated temperature is approximately 350° C. to 500° C.

13. An anode as claimed in claim 10, wherein after the heat treatment, said substrate is subjected to further anodic oxidation.

14. An anode as claimed in claim 1, wherein said aluminum foil comprising said substrate has a percentage purity of approximately 99.5%.

15. An anode as claimed in claim 1, wherein said alloy further comprises a fraction of said metal between approximately 20% and 40%.

16. An anode as claimed in claim 1, wherein said alloy is heated and vapor-deposited by an electron beam with an energy adaptable to be appropriate to metals in said alloy.

17. An electrolytic capacitor comprising an anode comprising:
   a substrate comprising an aluminum foil, and
   an alloy comprising aluminum and a metal whose oxide has a higher dielectric constant than aluminum oxide, wherein said alloy is vapor-deposited on said substrate in a vacuum in several process steps at different angles of incidence to increase surface roughness, thereby forming a porous layer, and subsequently subjecting said alloy to an anodic oxidation.

* * * * *